United States Patent [19]

Yonemoto

[11] Patent Number: 5,796,431
[45] Date of Patent: Aug. 18, 1998

[54] SOLID-STATE IMAGE PICKUP DEVICE AND DRIVING METHOD THEREOF

[75] Inventor: Kazuya Yonemoto, Tokyo, Japan

[73] Assignee: Sony Corporation, Tokyo, Japan

[21] Appl. No.: 687,998

[22] Filed: Jul. 29, 1996

[30] Foreign Application Priority Data

Jul. 31, 1995 [JP] Japan ..................... 7-194420

[51] Int. Cl.$^6$ ........................... H04N 3/14
[52] U.S. Cl. ............................ 348/308
[58] Field of Search ................... 348/302, 304, 348/308, 241

[56] References Cited

U.S. PATENT DOCUMENTS

| | | | |
|---|---|---|---|
| 5,335,008 | 8/1994 | Hamasaki | 348/308 |
| 5,434,619 | 7/1995 | Yonemoto | 348/308 |
| 5,693,932 | 12/1997 | Ueno | 348/308 |
| 5,698,852 | 12/1997 | Tanaka | 348/308 |

*Primary Examiner*—Bryan Tung
*Attorney, Agent, or Firm*—Hill & Simpson

[57] ABSTRACT

To provide a solid-state image pickup device and a driving method thereof with which it is possible to remove fixed pattern noise without making the scale of circuits around the device large. First and second load capacitors 16a and 16b having the same capacitance are provided. MOS transistors 15a, 15b, which are first and second operating switches, are connected between a vertical signal line 13 and first ends of the first and second load capacitors 16a and 16b, a MOS transistor 18, which is a common operating switch, is connected between second ends of the first and second load capacitors 16a and 16b and a reference potential point (in this example, ground) and MOS transistors 17a and 17b, which are first and second horizontal switches, are connected between the second ends of the first and second load capacitors 16a and 16b and a horizontal signal line 19 and a bias line 20 at a predetermined potential.

8 Claims, 9 Drawing Sheets

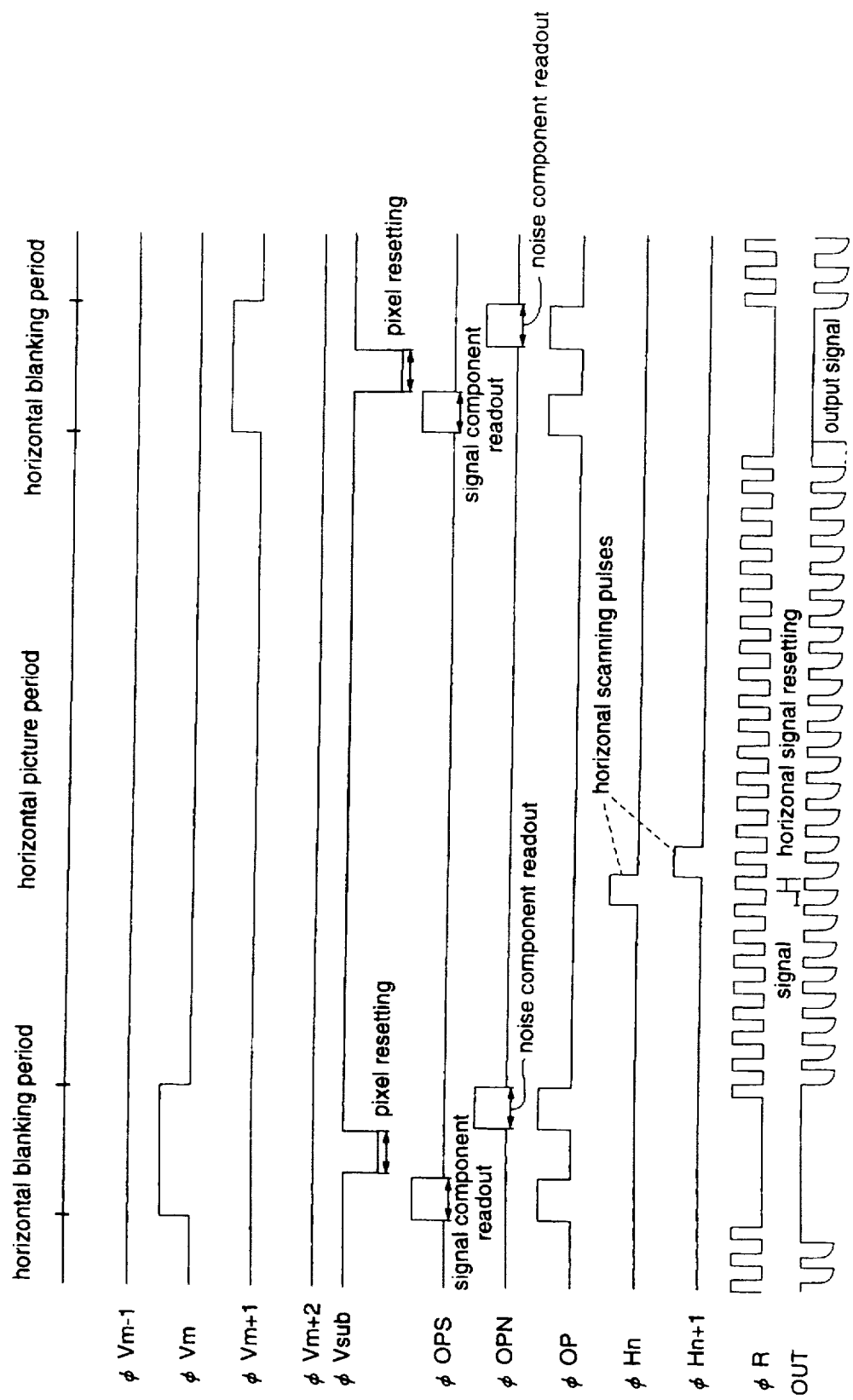

20

SOLID-STATE IMAGE PICKUP DEVICE AND DRIVING METHOD THEREOF

BACKGROUND OF THE INVENTION

The invention relates to a solid-state image pickup device and a driving method thereof, and particularly to an X-Y address type solid-state image pickup device and a driving method thereof with which it is possible to read out pixel information corresponding to signal charges accumulated by photoelectric conversion pixel by pixel.

In an amplifying solid-state image pickup device, which is a kind of X-Y address type solid-state image pickup device, in order to give each pixel an amplifying function, active devices of MOS structure and the like (MOS transistors) have been used to constitute pixels. However, differences in the characteristics of the active devices (dispersion)has directly entered the picture signal. Because this dispersion in characteristics has a fixed value for each pixel it appears in the picked-up image as fixed pattern noise (FPN). This fixed pattern noise is not the result of dispersion in sensitivity with respect to incident light but is a result of dispersion in pixel threshold values being added to signal quantities corresponding to incident light.

A related art example of an amplifying solid-state image pickup device is shown in FIG. 10. In FIG. 10, multiple pixel transistors 101 are arrayed in a matrix, 25 the gate electrodes of the pixel transistors 101 are connected row-by-row to vertical selection lines 102, the source electrodes are connected column-by-column to vertical signal lines 103 and a power supply voltage VD is connected on the drain electrodes. Each vertical selection line 102 is connected to an output terminal of a vertical scanning circuit 104. Each vertical signal line 103 is connected to the drain electrodes of NchMOS transistors 105a, 105b.

Operating pulses φOPS, φOPN are provided to the gate electrodes of the MOS transistors 105a, 105b. The source electrodes of the MOS transistors 105a, 105b are connected to first ends of capacitors 106a, 106b and are also connected to the drain electrodes of NchMOS transistors 107a, 107b. Second ends of the capacitors 106a, 106b are commonly grounded. The source electrodes of the MOS transistors 107a, 107b are respectively connected to horizontal signal lines 108a, 108b and the gate electrodes thereof are commonly connected to output terminals of horizontal scanning circuit 109.

The horizontal signal lines 108a, 108b are connected to input terminals (inverting (−) input terminals of differential amplifiers 110) of a pair of output circuits 113a, 113b each made up of a differential amplifier 110, a detecting capacitor 111 and a MOS transistor 112 for resetting. Output terminals (output terminals of the differential amplifiers 110) of the output circuits 113a, 113b are connected to a pair of output terminals 114a, 114b. A non-inverting (+) input terminal and an inverting (−) input terminal of a differential amplifier 115 are connected to this pair of output terminals 114a, 114b.

Next, a circuit operation for removing fixed pattern noise in the related art example of the above construction will be described. First, a signal, before pixel resetting led out to the source electrode of the pixel transistor 101 according to a signal charge resulting from incident light being photoelectrically converted and accumulated, is sent out from the vertical signal line 103 through the MOS transistor 105a to the capacitor 106a and also a signal led out to the source electrode of the pixel transistor 101 after the signal charge accumulated in the same pixel transistor 101 is reset (after pixel resetting) is similarly sent out from the vertical signal line 103 through the MOS transistor 105b to the capacitor 106b.

Then, the signals from before and after pixel resetting held in the capacitors 106a and 106b are read out into the horizontal signal lines 108a, 108b by the MOS transistors 107a, 107b being turned on, pass through the separate output circuits 113a, 113b and are output to outside from the output terminals 114a, 114b, and subtraction processing is carried out by the differential amplifier 115 provided outside. As a result, fixed pattern noise is canceled out and a signal from which fixed pattern noise has been removed is obtained.

However, in the related art amplifying solid-state image pickup device described above, there has been the problem that in removing fixed pattern noise it is necessary to provide the differential amplifier 115 as an outside circuit for subtracting the signals from before and after pixel resetting output from the device. Therefore, the circuit construction is complicated and the power consumption is high, and when there is a difference in gain between the two output circuits 113a, 113b of the device for outputting the signals from before and after pixel resetting, a circuit for correcting this difference in gain outside becomes necessary, and the scale of the circuits around the device becomes large.

SUMMARY OF THE INVENTION

An object of the present invention is to provide a solid-state image pickup device and a driving method thereof with which it is possible to remove fixed pattern noise without making the scale of circuits around the device large.

To that end, in an embodiment a solid-state image pickup device according to the invention has a construction comprising, in addition to multiple pixels arrayed in a matrix, a vertical scanning circuit for controlling control electrodes of pixels of a row commonly connected by a vertical selection line and a horizontal scanning circuit for sequentially outputting row-by-row to an output terminal, signals of pixels output through a vertical signal line to which main electrodes of pixels of a column are commonly connected: 1) first and second capacitors having the same capacitance, 2) first and second operating switches respectively connected between the vertical signal line and first ends of the first and second capacitors, 3) a common operating switch connected between second ends of the first and second capacitors and a reference potential point, and 4) first and second horizontal switches respectively connected between the second ends of the first and second capacitors and the horizontal signal line and a bias line at a predetermined potential.

In this construction, a signal output from each pixel is held in the first capacitor by an operation wherein the first operating switch is changed over from an "on" state to an "off" state while the common operating switch is "on." A signal output from the pixel immediately after pixel resetting is then held in the second capacitor by an operation wherein the second operating switch is changed over from an "on" state to an "off" state while the common operating switch is "on." Thereafter, the signals held in the first and second capacitors are output through the horizontal signal line to the output terminal by the first and second horizontal switches being turned "on" while the first and second operating switches and the common operating switch are "off."

Another solid-state image pickup device according to the invention has a construction comprising multiple pixels arrayed in a matrix, a vertical scanning circuit for controlling control electrodes of pixels of a row commonly connected by a vertical selection line, a horizontal scanning circuit for sequentially outputting row-by-row to an output terminal, signals of pixels output through a vertical signal line to

3 which main electrodes of pixels of a column are commonly connected: 1) first and second capacitors having the same capacitance, 2) first and second operating switches respectively connected between the vertical signal line and first ends of the first and second capacitors, 3) first and second biasing switches respectively connected between second ends of the first and second capacitors and a first bias line at a predetermined potential, 4) first and second reversing switches respectively connected between the first end of one and the second end of the other of the first and second capacitors, and 5) first and second horizontal switches respectively connected between the second ends of the first and second capacitors and the horizontal signal line and a second bias line at a predetermined potential.

In this construction, a signal output from each pixel is held in the first capacitor by an operation wherein the first operating switch is changed over from an "on " state to an "off" state while the first biasing switch is "on." A signal output from the pixel immediately after pixel resetting is then held in the second capacitor by an operation wherein the second operating switch is changed over from an "on " state to an "off " state while the second biasing switch is on. Thereafter, the signals held in the first and second capacitors are output through the horizontal signal line to the output terminal by the first and second horizontal switches being turned "on " after the first and second reversing switches are turned "on " while the first and second operating switches and the first and second biasing switches are "off."

In a solid-state image pickup device according to the invention, a signal (signal component) from a pixel is held in a first load capacitor by a pixel capacitor loading operation (readout operation) which is carried out by a first operating switch and a common operating switch being turned on. After this capacitor loading operation is carried out, a signal charge accumulated in the pixel is reset and while there is no signal charge a signal (noise component) from the pixel is held in a second load capacitor by a pixel capacitor loading operation which is carried out by a second operating switch and the common operating switch being turned on. Then, when first and second horizontal switches are turned on while the common operating switch is off, the signal component and the noise component held in the first and second load capacitors flow as charges with reverse polarity into a horizontal signal line, the noise component is subtracted from the signal component by a charge detecting circuit and, as a result, fixed pattern noise included in the signal component is removed.

In another solid-state image pickup device according to the invention, a signal (signal component) from a pixel is held in a first load capacitor by a pixel capacitor loading operation which is carried out by a first operating switch and a first biasing switch being turned on. After this capacitor loading operation is carried out, a signal charge accumulated in the pixel is reset and while there is no signal charge a signal (noise component) from the pixel is held in a second load capacitor by a pixel capacitor loading operation which is carried out by a second operating switch and a second biasing switch being turned on. Then, when first and second reversing switches are turned on while the first and second biasing switches are off, the first and second capacitors are connected in parallel with mutually reversed polarity and fixed pattern noise included in the signal component and the noise component (fixed pattern noise) cancel each other out.

These and other features of the invention are discussed in greater detail below in the following detailed description of the presently preferred embodiments with reference to the accompanying drawings.

4

BRIEF DESCRIPTION OF THE DRAWINGS

FIG. 2 is a timing chart for illustrating the operation of the first preferred embodiment.

FIGD. 3(a), 3(b) and 3(c) illustrate equivalent circuit diagrams showing fixed pattern noise removal according to the invention.

Figure 4:
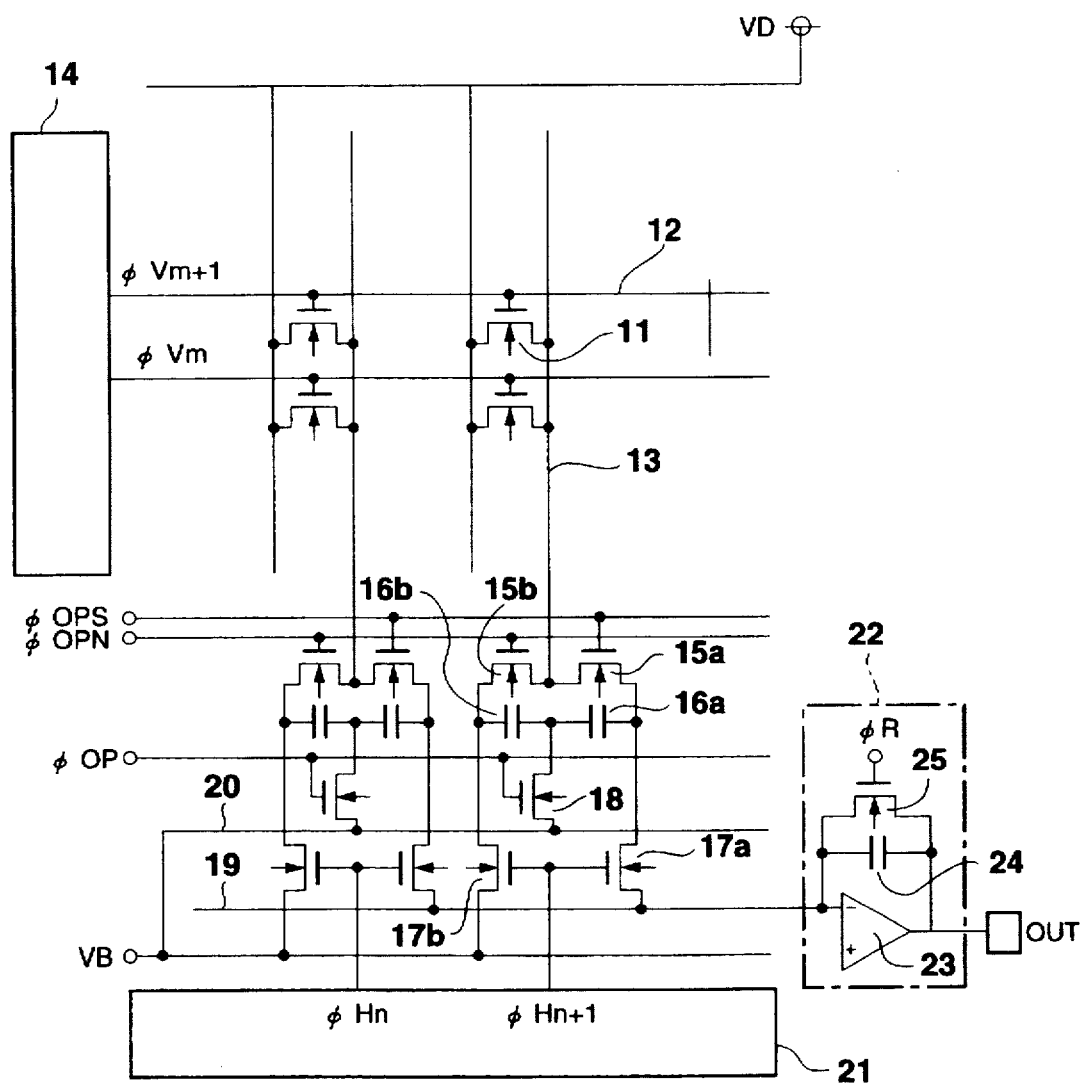

FIG. 4 is a circuit diagram showing the construction of a second preferred embodiment of the invention.

Figure 5:
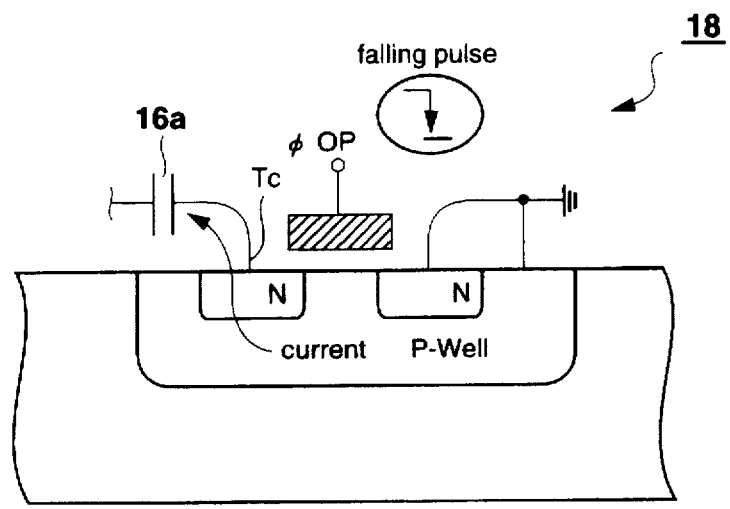

FIG. 5 is a sectional construction view showing an example of a common operating switch.

Figure 6:
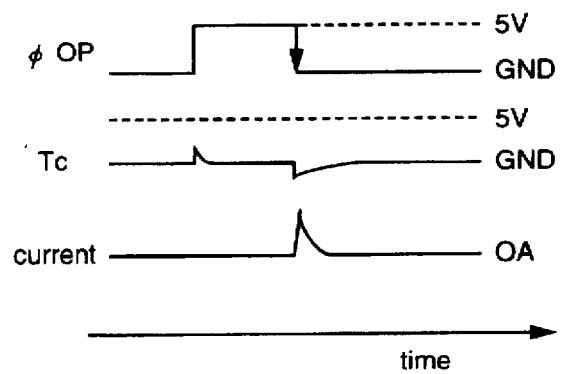

FIG. 6 is an operation waveform graph of a common operating switch.

Figure 7:
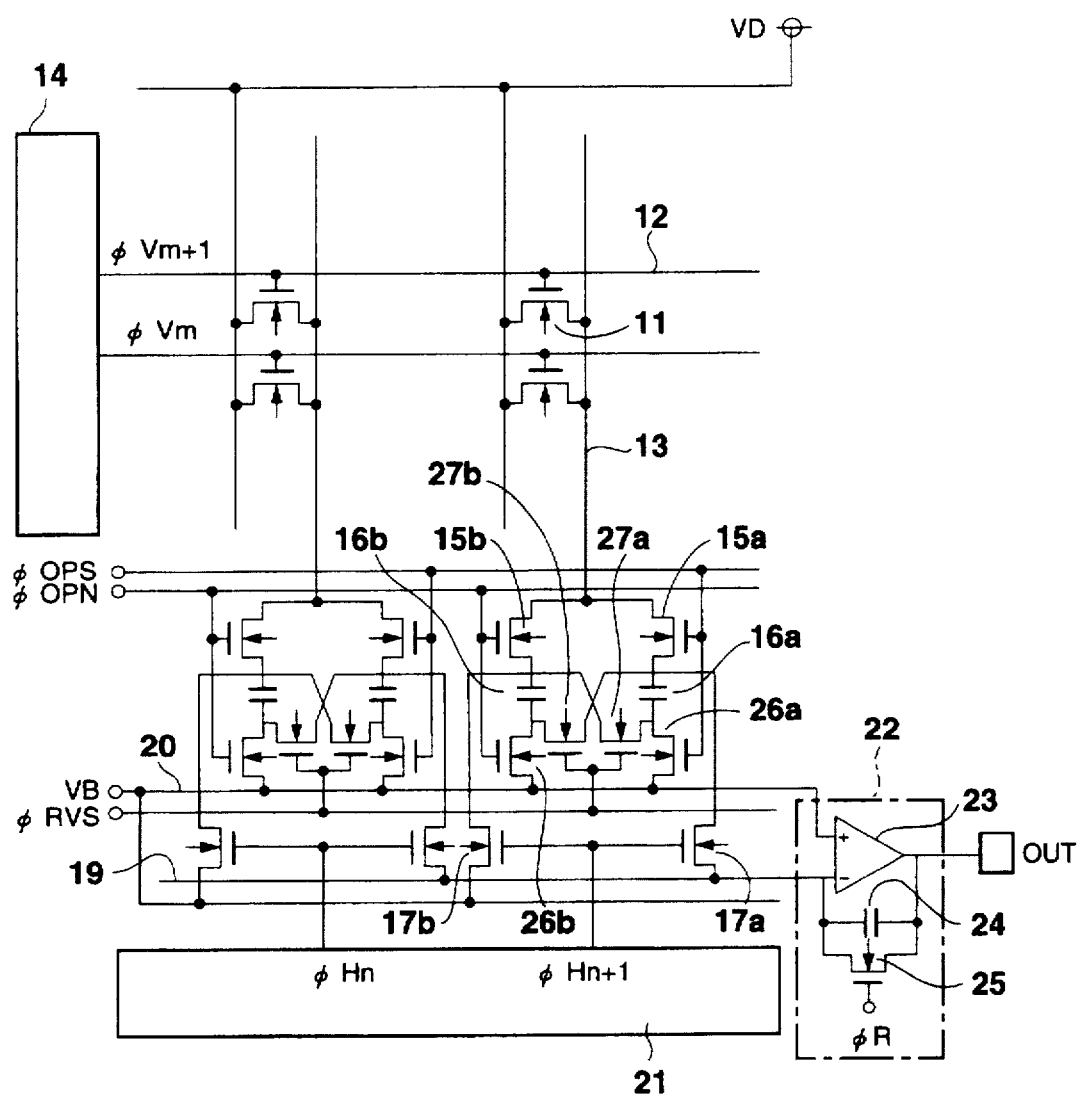

FIG. 7 is a circuit diagram showing the construction of a third preferred embodiment of the invention.

Figure 8:
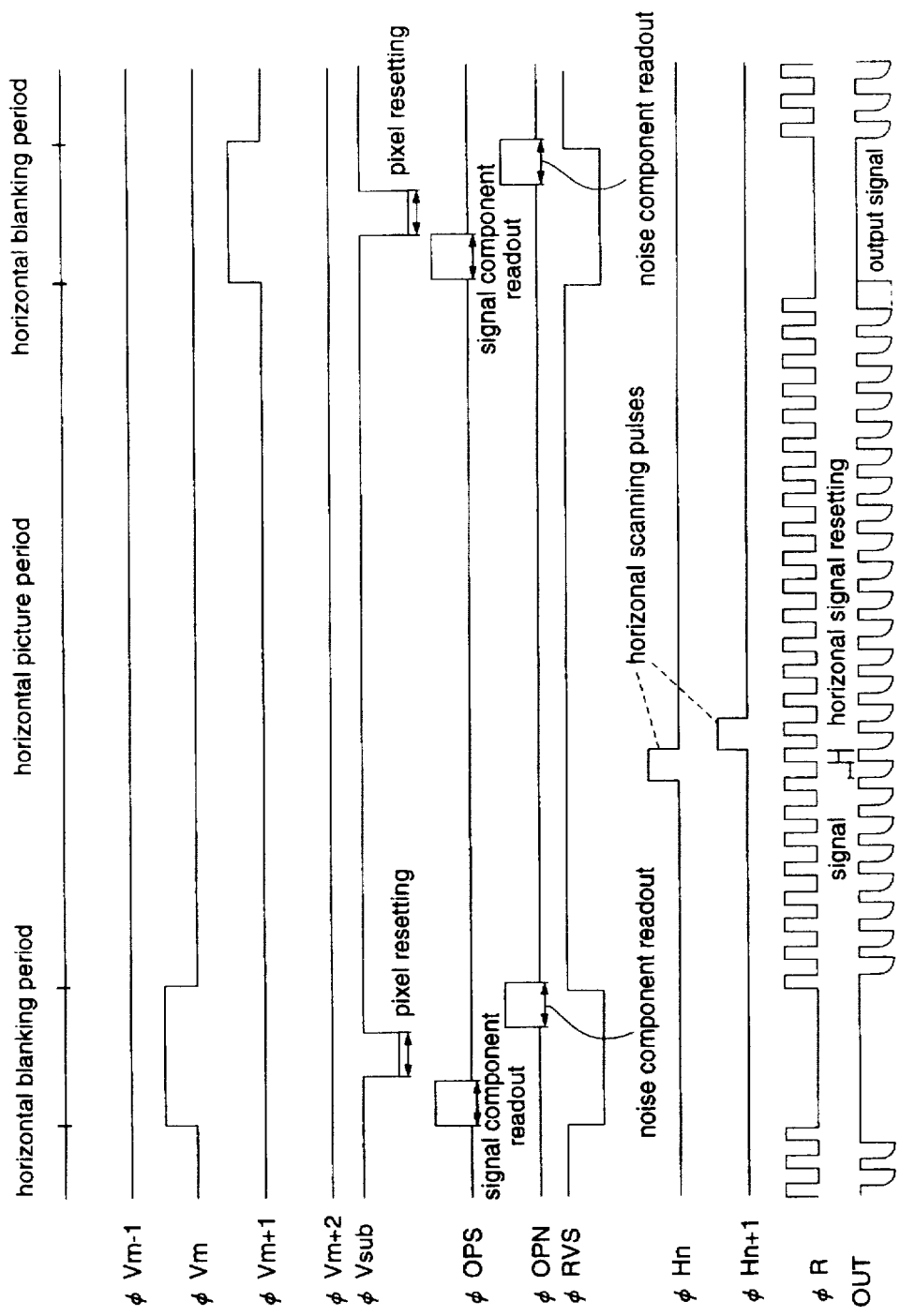

FIG. 8 is a timing chart for illustrating the operation f the third preferred embodiment.

Figure 9A:
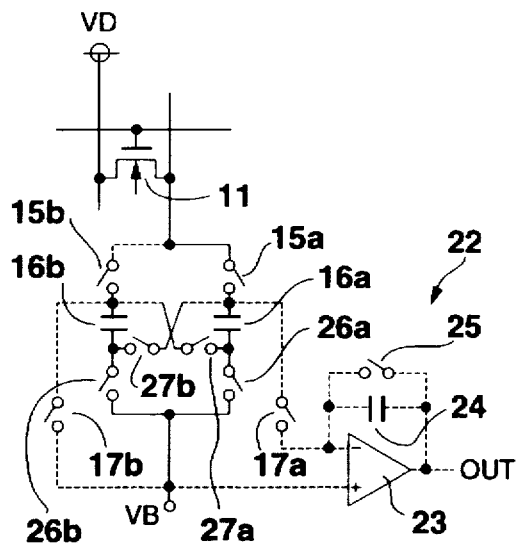
Figure 9B:
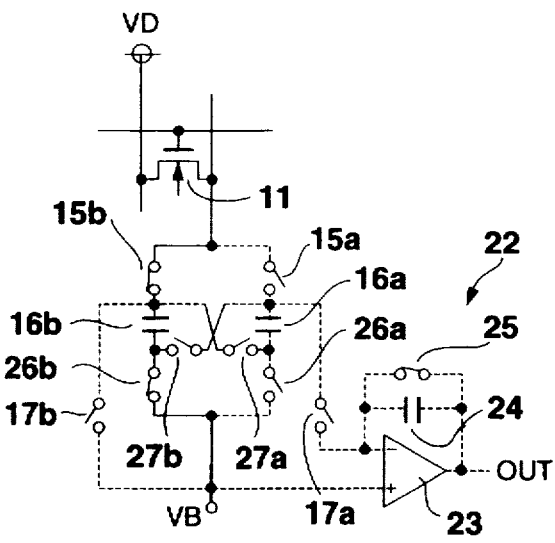
Figure 9C:
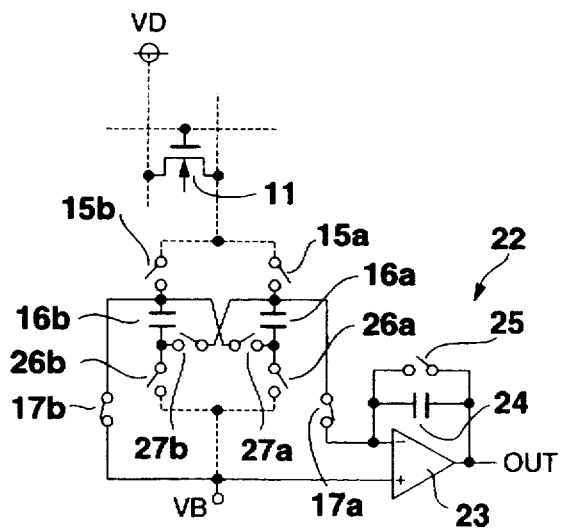

FIGS. 9(a), 9(b) and 9(c) illustrate equivalent circuit diagrams showing fixed pattern noise removal according to the third preferred embodiment.

Figure 10:
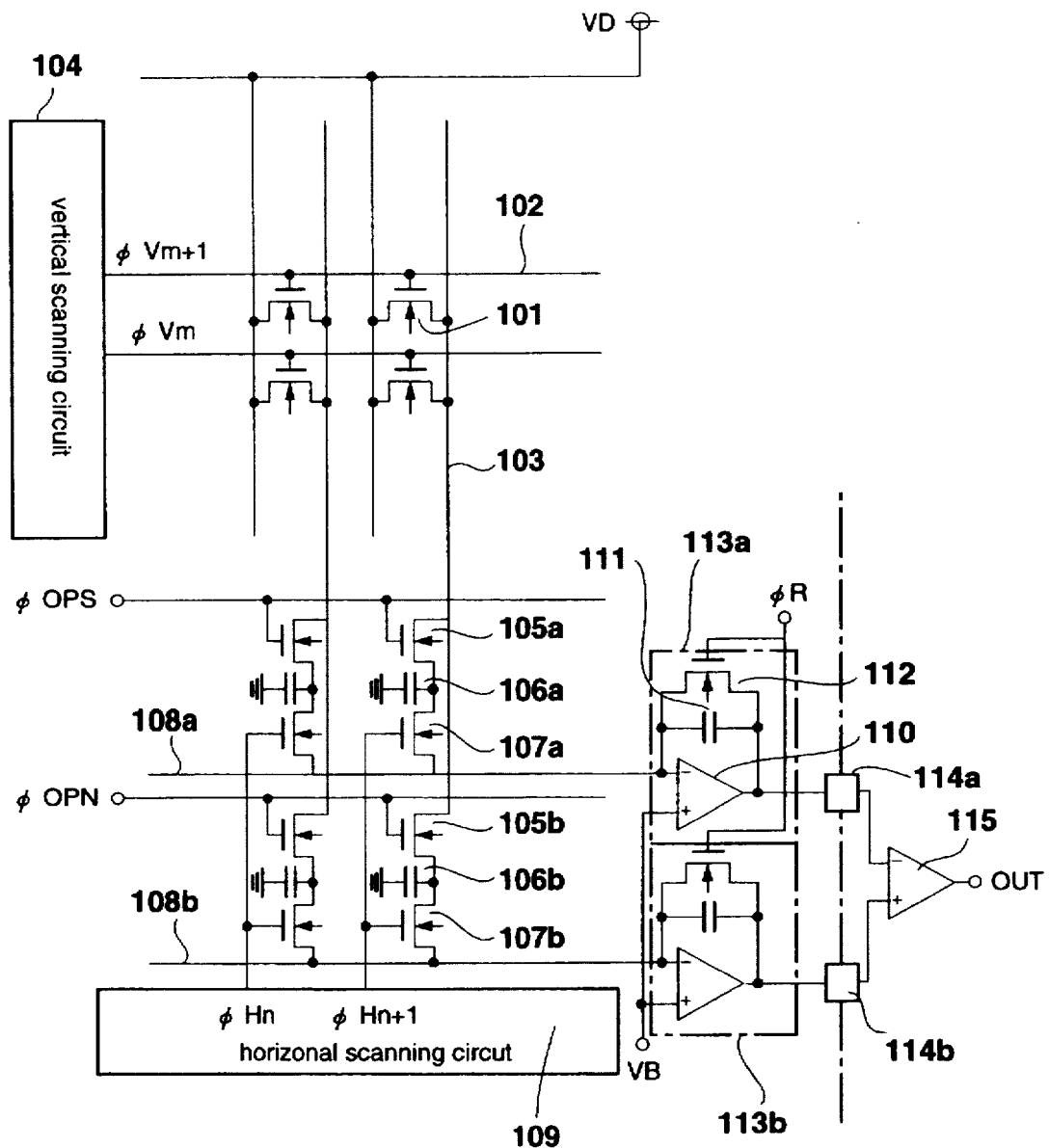

FIG. 10 is a circuit diagram showing the construction of a related art example.

DETAILED DESCRIPTION OF THE PRESENTLY PREFERRED EMBODIMENTS

Preferred embodiments of the invention will now be described in detail with reference to the accompanying drawings.

Figure 1:
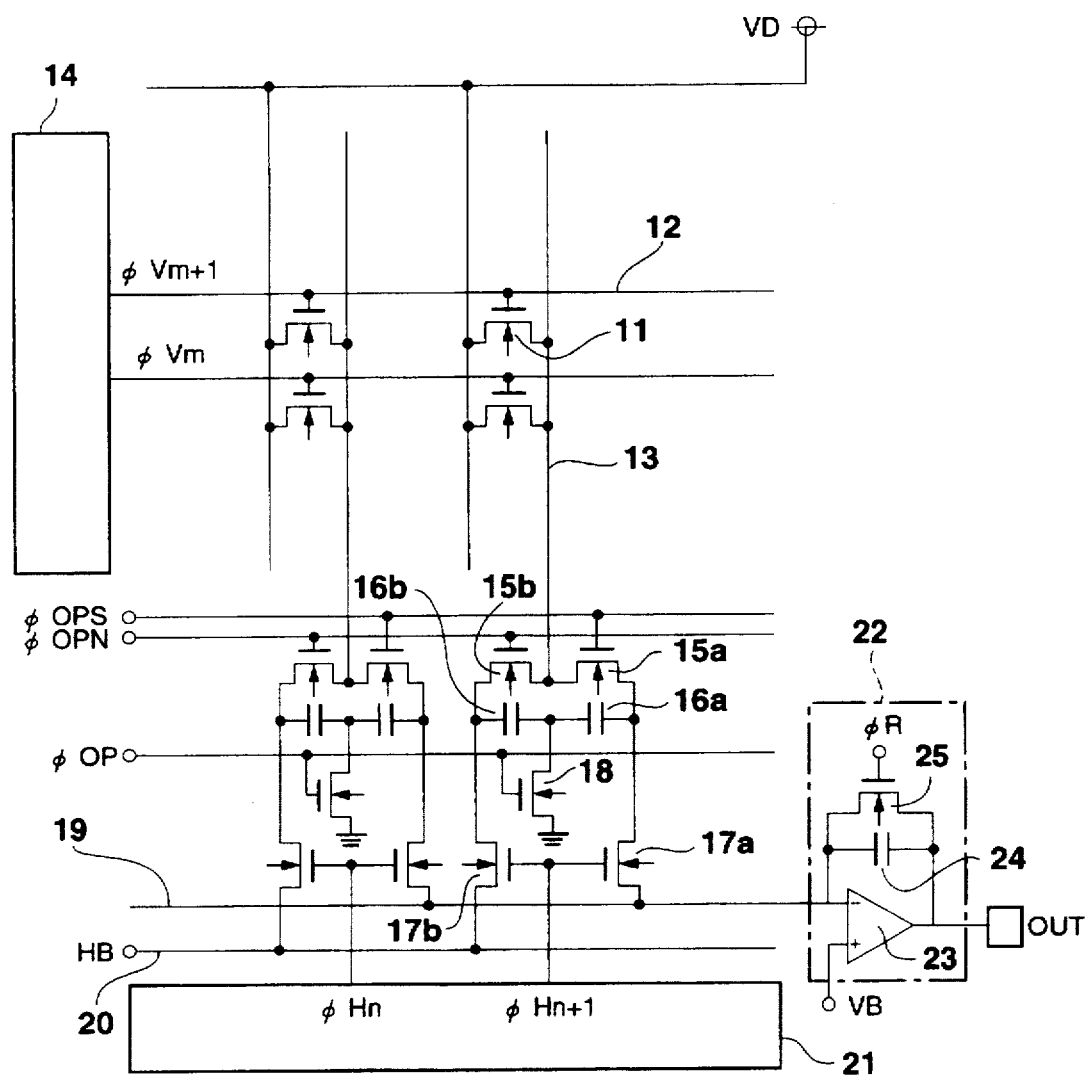
FIG. 1 is a circuit diagram showing the construction of a first preferred embodiment of the invention.

FIG. 1 is a circuit diagram showing the construction of a first preferred embodiment of the invention. In FIG. 1, multiple pixel transistors (in this example, NchMOS transistors are shown) 11 are arrayed in a matrix; the gate electrodes (control electrodes) of the pixel transistors 11 are connected row-by-row to vertical selection lines 12, the source electrodes (main electrodes) are connected column by column to vertical signal lines 13 and a power supply voltage VD is impressed on the drain electrodes. The vertical selection lines 12 are connected to output terminals of a vertical scanning circuit 14.

The vertical scanning circuit 14 consists of a shift register or the like and applies vertical selecting pulses $\phi V$ ($\phi V1, \ldots, \phi Vm, \phi Vm+1, \ldots$) to the vertical selection lines 12 to sequentially read out pixel information line by line. The vertical signal lines 13 are commonly connected to the drain electrodes of NchMOS transistors 15a, 15b which are first and second operating switches. These MOS transistors 15a, 15b are formed to the same size (they have the same parameters and substantially the same measurements) and have operating pulses $\phi OPS$, $\phi OPN$ provided to their gate electrodes. The source electrodes of the MOS transistors 15a, 15b are connected to first ends of first and second load capacitors 16a and 16b respectively and are also connected to the drain electrodes of NchMOS transistors 17a, 17b, which are first and second horizontal switches.

Second ends of the load capacitors 16a and 16b are commonly connected to the drain electrode of an NchMOS transistor 18, which is a common operating switch. The source electrode of this MOS transistor 18 is grounded and a reading-out pulse $\phi OP$ is provided to the gate electrode thereof. The MOS transistors 17a and 17b are formed to the same size (they have the same parameters and substantially the same measurements), their source electrodes are respectively connected to a horizontal signal line 19 and a bias line 20 and their gate electrodes are commonly connected to an output terminal of a horizontal scanning circuit 21. This horizontal scanning circuit 21 consists of a shift register or the like and applies horizontal scanning pulses φH (φH1, . . . , φHn, φHn+1, . . . ) to the gate electrodes of the MOS transistors 17a and 17b to turn on the MOS transistors 17a and 17b and thereby connect the horizontal signal line 19 and the bias line 20 to the first ends of the first and second load capacitors 16a and 16b.

The horizontal signal line 19 is connected to the inverting (−) input terminal of a differential amplifier 23 of a charge detecting circuit 22 and the bias line 20 is connected to a bias terminal HB. The non-inverting (+) input terminal of the differential amplifier 23 is connected to a bias terminal VB which applies a predetermined bias voltage determining the potential at which the horizontal signal line 19 operates. The charge detecting circuit 22 is made up of the differential amplifier 23, a detecting capacitor 24 connected across the inverting input terminal and an output terminal of this differential amplifier 23 and an NchMOS transistor 25, which is a resetting switch, connected in parallel with this detecting capacitor 24, and a resetting pulse φR is provided to the gate electrode of the NchMOS transistor 25.

Next, the circuit operation of the first preferred embodiment of the construction described above will be described on the basis of the timing chart of FIG. 2. The vertical selecting pulses φV (φV1 , . . . , φVm, φVm+1, . . . ) are sent out from the vertical scanning circuit 14 shown in FIG. 1 to the vertical selection lines 12, and in the example shown in FIG. 2, the vertical selecting pulse φVm of the mth row assumes a high voltage in a horizontal blanking period on the left in the timing chart. That is, the mth row of pixels become selected and a capacitor loading operation (readout operation) and a pixel resetting operation are carried out.

First, when in the first half of the horizontal blanking period on the left in the timing chart, the operating pulse φOPS and the reading-out pulse φOP rise, the MOS transistor 15a, which is a first operating switch, and the MOS transistor 18, which is a common operating switch, turn "on." As a result, the second end of the first load capacitor 16a is grounded by way of the MOS transistor 18 and a signal corresponding to a quantity of light entering the device through the pixel of the mth row is read out through the MOS transistor 15a into the first load capacitor 16a as a signal component. This signal component is held in the first load capacitor 16a by the operating pulse φOPS and the reading-out pulse φOP falling. When a substrate voltage φVsub falls in the negative direction in the middle of the horizontal blanking period, the signal charge which had been accumulated in the pixel of the mth row flows out into the substrate and pixel resetting is thereby carried out.

Next, when the operating pulse φOPN and the reading-out pulse φOP rise in the second half of the horizontal blanking period, the MOS transistor 15b, which is a second operating switch, and the MOS transistor 18 turn "on." As a result, the second end of the second load capacitor 16b is grounded through the MOS transistor 18 and a signal after pixel resetting is read out from the pixel of the mth row through the MOS transistor 15b into the second load capacitor 16b as a noise component. This noise component is held in the second load capacitor 16b by the operating pulse φOPN and the reading-out pulse φOP falling. As a result, a signal component and a noise component of the pixel of the mth row are independently held in the first and second load capacitors 16a and 16b respectively.

Then, in a horizontal picture period, by the horizontal scanning pulses φH (φH1 , . . . , φHn, φHn+1, . . . ) being output from the horizontal scanning circuit 21, the MOS transistors 17a and 17b, which are first and second horizontal switches which receive the gate pulses as gate inputs, turn "on." As a result, the first and second load capacitors 16a and 16b become connected in series with reverse polarity and the signal component and the noise component held in these first and second load capacitors 16a and 16b are sent out onto the horizontal signal line 19 with mutually reversed polarity. Then, when the horizontal scanning pulse φHn rises, the output signal OUT in FIG. 2 appears and in the second half of the horizontal scanning pulse φHn the resetting pulse φR rises and resets the horizontal signal line 19 to the bias VB.

Figure 3A:
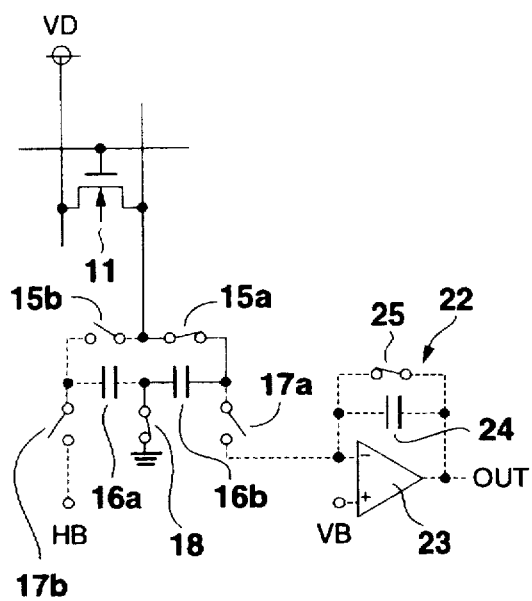
Figure 3B:
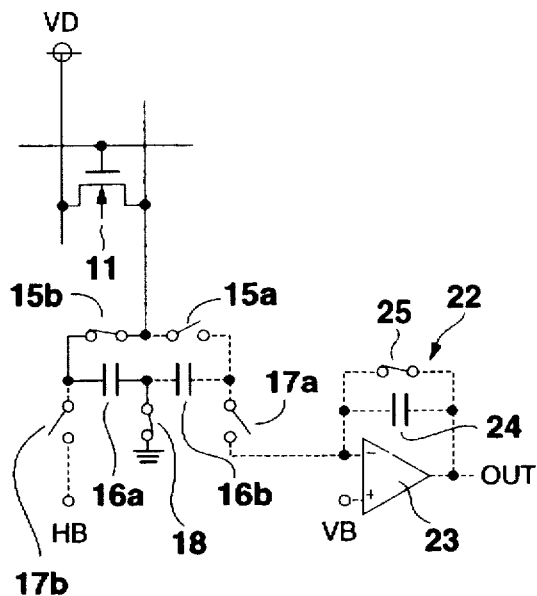
Figure 3C:
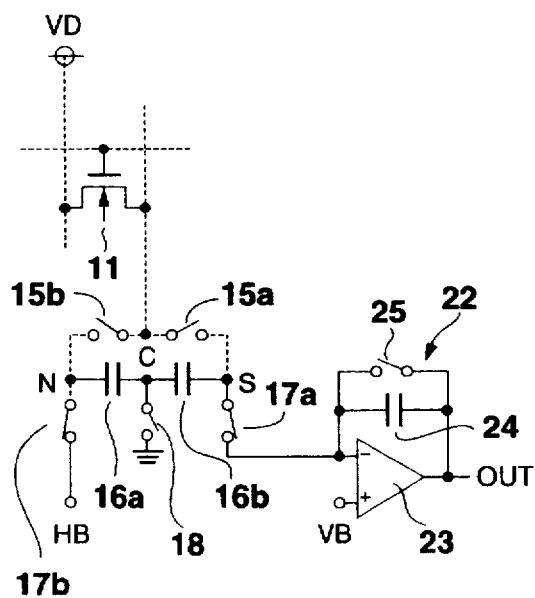

Here, how the fixed pattern noise of the pixel is removed will be explained using FIGS. 3(a), 3(b) and 3(c). FIGS. 3(a), 3(b) and 3(c) are equivalent circuit diagrams useful for illustrating a fixed pattern noise canceling operation using a pixel transistor 11, the MOS transistors 15a, 15b which are first and second operating switches, the first and second load capacitors 16a and 16b, the MOS transistor 18 which is a common operating switch, the MOS transistors 17a and 17b, which are first and second horizontal switches, and the charge detecting circuit 22.

First, at the time of signal component read-out illustrated in FIG. 3(a), the pixel transistor 11 is made operational by the vertical selection line 12, the MOS transistor 15a and the MOS transistor 18 are on and a signal is read out into the first load capacitor 16a. The wiring necessary for this readout operation is shown with solid lines and wiring not necessary for this operation is shown with broken lines. Similarly also at the time of noise component read-out illustrated in FIG. 3(b), the pixel transistor 11 is made operational by the vertical selection line 12, the MOS transistor 15b and the MOS transistor 18 are on and a signal is read out into the second load capacitor 16b. That is, as a result of this series of operations, a signal component and a noise component are independently held in the first and second load capacitors 16a and 16b.

When the reading-out of the signal component and the noise component finishes, because the MOS transistor 18, whose drain is commonly connected to the second ends of the first and second load capacitors 16a and 16b, becomes "off," in the charge detecting operation illustrated in FIG. 3(c) the first and second load capacitors 16a and 16b are connected with mutually reversed polarity. Because as a result of this a signal component including fixed pattern noise (Vsig.+Vfpn) is held between the connection points S and C in FIG. 3(c) and a noise component (Vfpn), which is fixed pattern noise, is held between the connection points N and C, between the connection points S and N the fixed pattern noise is canceled out and only the signal component (=Vsig.+Vfpn−Vfpn=Vsig.) appears. If with the load capacitors 16a and 16b connected in series the signal is demodulated by the charge detecting circuit 22 by way of the MOS transistors 17a and 17b, only the signal component (Vsig.) held between the connection points S and N is detected and output.

In this way, when the second ends of the first and second load capacitors 16a and 16b are grounded through the MOS transistor 18, which is a common operating switch, and the signal component and the noise component held in the first and second load capacitors 16a and 16b are read out, as a result of the MOS transistors 17a and 17b, which are first and second horizontal switches, being turned on while the MOS transistor 18 is off, the signal component and the noise component flow as charges into the horizontal signal line 19 with reverse polarity, the noise component is thereby subtracted and only the signal component is output from the charge detecting circuit 22, and consequently it is possible to remove the fixed pattern noise without providing a differential amplifier as an external circuit as in the related technology and furthermore because only one charge detecting circuit 22 is required the circuit construction also can be simplified.

Also, because the construction is such that when the signal component and the noise component held in the first and second load capacitors 16a and 16b are read out to the horizontal signal line 19, both of these components flow onto the horizontal signal line 19 as charges with reverse polarity. By accurately setting the capacitances of the two load capacitors 16a and 16b so that they are equal, it is possible to certainly cancel out fixed pattern noise. Furthermore, as a result of the second ends of the first and second load capacitors 16a and 16b being fixed in a direct current manner (in this example, grounded) by way of the MOS transistor 18, when reading out the signal component and when reading out the noise component from the pixel, the influence of the parasitic capacities of the MOS transistors 15a, 15b and the MOS transistors 17a and 17b is not present and consequently it is possible to perform the operation of fixed pattern noise removal more certainly.

FIG. 4 is a circuit diagram showing the construction of a second preferred embodiment of the invention. In FIG. 4, parts equivalent to parts in FIG. 1 are shown with the same reference numerals. In this second preferred embodiment, the grounded side of the common operating switch, i.e. the source electrode of the MOS transistor 18, is connected to the bias line 20, and this bias line 20 is connected to a bias terminal VB. That is, the bias terminal HB in the first preferred embodiment is dispensed with and made common with the bias terminal VB. The rest of the construction is the same as that of the first preferred embodiment shown in FIG. 1. A predetermined bias voltage determining the operating potential of the horizontal signal line 19 is applied to the bias terminal VB.

Supposing now that as the common operating switch, as shown in a sectional view in FIG. 5, an NchMOS transistor 18 with a grounded P-well is used, when the read-out pulse φOP falls, the connection point Tc between the first load capacitor 16a and the drain (N-type diffusion region) of the MOS transistor 18 receives the read-out pulse φOP and assumes a voltage lower than ground (GND), and as a result a phenomenon occurs wherein a forward direction voltage arises across the PN junction between the P-well and the drain and a current flows between the P-well and the first load capacitor 16a. This current has an effect of destroying the signal charge held in the first load capacitor 16a and can be considered fatal to the load capacitor operation. In FIG. 6, waveforms of the reading-out pulse φOP, the voltage of the connection point Tc and the current flowing between the P-well and the first load capacitor 16a are shown.

However, in this second preferred embodiment, because a positive voltage, i.e. a bias voltage determining the operating voltage of the horizontal signal line 19 applied to the bias terminal VB, is applied to the source of the MOS transistor 18, which is a common operating switch, even when receiving coupling of the pulse when the reading-out pulse φOP falls, the connection point Tc between the first load capacitor 16a and the drain of the MOS transistor 18 does not fall below ground potential (GND). That is, because no current flows between the P-well and the first load capacitor 16a, the signal charge held in the first load capacitor 16a is not destroyed. Furthermore, there are also the advantages that it is possible to reduce the number of types of bias and that together with this it is possible to reduce the number of bias terminals.

FIG. 7 is a circuit diagram showing the construction of a third preferred embodiment of the invention. In FIG. 7, parts equivalent to parts in FIG. 1 are shown with the same reference numerals. This third preferred embodiment is the same as the first preferred embodiment in that the source electrodes of NchMOS transistors 15a, 15b, which are first and second operating switches, are connected to first ends of first and second load capacitors 16a and 16b and are also connected to the drain electrodes of NchMOS transistors 17a and 17b, which are first and second horizontal switches; what differ are the points described below.

In FIG. 7, the second ends of the first and second load capacitors 16a and 16b are connected to the drain electrodes of NchMOS transistors 26a, 26b, which are first and second biasing switches, and are connected to the source electrodes of NchMOS transistors 27a, 27b, which are first and second reversing switches. The source electrodes of the MOS transistors 26a, 26b are connected to a bias line VB and operating pulses φOPS, φOPN are respectively provided to their gate electrodes. The drain electrodes of the NchMOS transistors 27a, 27b are connected to the second ends of the load capacitors 16b and 16a and a reversing pulse φRVS is provided to their gate electrodes.

The source electrodes of the MOS transistors 17a and 17b are respectively connected to the horizontal signal line 19 and the bias line 20, and horizontal scanning pulses φH (φH1, . . . , φHn, φHn+1, . . . ) are applied to their gate electrodes from the horizontal scanning circuit 21. The horizontal signal line 19 is connected to an inverting (−) input terminal of a differential amplifier 23 of a charge detecting circuit 22 and the bias line 20 is connected to the bias terminal VB. The circuit construction of the charge detecting circuit 22 is the same as in the case of the first preferred embodiment.

In this third preferred embodiment, the source electrodes of the MOS transistors 26a, 26b, which are first and second biasing switches, are connected to the same bias line 20 as the source electrode of the MOS transistor 17b, which is a second horizontal switch, and a bias voltage determining the operating potential of the horizontal signal line 19 is applied to the source electrodes of the MOS transistors 26a, 26b; however, the invention is not limited to this and it is also possible to provide a bias line separate from the bias line 20 and apply thereto a bias voltage different from the bias voltage determining the operating potential of the horizontal signal line 19.

Next, the circuit operation of the third preferred embodiment constructed as described above will be explained on the basis of the timing chart of FIG. 8. In that regard, vertical selecting pulses φV (φV1, . . . , φVm, φVm+1, . . . ) are sent out from the vertical scanning circuit 14 shown in FIG. 7 to the vertical selection lines 12, and, in the example shown in FIG. 8 (for example, in a horizontal blanking period to the left in the chart) the vertical selecting pulse φVm of the mth row assumes a high voltage. That is, the pixels of the mth row are selected and a capacitor loading operation (readout operation) and a pixel resetting operation are carried out.

First, when in the first half of the horizontal blanking period (on the left in the chart), an operating pulse φOPS rises, the MOS transistor 15a, which is a first operating switch, and the MOS transistor 26a, which is a first biasing switch, turn "on." As a result, the second end of the first load capacitor 16a is biased, by way of the MOS transistor 26a, and a signal corresponding to a quantity of light entering the device through the respective pixel of the mth row is read out through the MOS transistor 15a into the first load capacitor 16a as a signal component. This signal component is held in the first load capacitor 16a by the operating pulse φOPS falling. When a substrate voltage φVsub falls in the negative direction in the middle of the horizontal blanking period, the signal charge which had been accumulated in the pixel of the mth row flows out into the substrate and pixel resetting is thereby carried out.

Next, when the operating pulse φOPN rises in the second half of the horizontal blanking period, the MOS transistor 15b, which is a second operating switch, and the MOS transistor 26b, which is a second biasing switch, turn "on." As a result, the second end of the second load capacitor 16b is biased through the MOS transistor 26b, and a signal of after pixel resetting is read out from the pixel of the mth row through the MOS transistor 15b into the second load capacitor 16b as a noise component. This noise component is held in the second load capacitor 16b by the operating pulse φOPN falling. As a result, a signal component and a noise component of the pixel of the mth row are independently held in the first and second load capacitors 16a and 16b respectively.

Then, in the horizontal picture period, when the reversing pulse φRVS rises, the MOS transistors 27a, 27b, which are reversing switches, turn "on." The first and second load capacitors 16a and 16b are thereby connected in parallel with mutually reversed polarity, and as a result the noise component (fixed pattern noise) included in the signal component, which had been held in the load capacitor 16a, and the noise component (fixed pattern noise), which had been held in the load capacitor 16b, cancel each other out.

After that, by the horizontal scanning pulses φH (φH1, ..., φHn, φHn+1, ...) being output from the horizontal scanning circuit 21, the MOS transistors 17a and 17b, which are first and second horizontal switches having these pulses as gate inputs, turn on and only the signal component of after the fixed pattern noise is canceled out is sent out to the horizontal signal line 19. When the horizontal scanning pulse φHn rises, the output signal OUT shown in FIG. 8 appears, and the resetting pulse φR rises in the second half of the horizontal scanning pulse φHn and resets the horizontal signal line 19 to the bias VB.

How the fixed pattern noise of the pixel is removed will now be explained using FIGS. 9(a), 9(b) and 9(c). FIGS. 9(a), 9(b) and 9(c) are equivalent circuit diagrams useful for illustrating a fixed pattern noise canceling operation showing just a pixel transistor 11, the MOS transistors 15a, 15b, which are first and second operating switches, the first and second load capacitors 16a and 16b, the MOS transistors 26a, 26b, which are first and second biasing switches, the MOS transistors 27a, 27b, which are first and second reversing switches, the MOS transistors 17a and 17b, which are first and second horizontal switches, and the charge detecting circuit 22.

First, at the time of signal component read-out illustrated in FIG. 9(a), the pixel transistor 11 is made operational by the vertical selection line 12, the MOS transistor 15a and the MOS transistor 26a turn on and a signal is read out into the first load capacitor 16a. The wiring necessary for this readout operation is shown with solid lines and wiring not necessary for this operation is shown with broken lines. Similarly also at the time of noise component read-out illustrated in FIG. 9(b), the pixel transistor 11 is made operational by the vertical selection line 12, the MOS transistor 15b and the MOS transistor 26b turn on and a signal is read out into the second load capacitor 16b and held.

That is, as a result of this series of operations, a signal component and a noise component are independently held in the first and second load capacitors 16a and 16b, respectively. Here, the signal component Vsig, held in the load capacitor 16a also includes a noise component Vfpn, and if the capacitance of the load capacitor 16a is written as Ca, this signal charge is expressed as follows: (Qsig.+Qfpn) =Cax(Vsig.+Vfpn). Also, if the capacitance of the second load capacitor 16b is written as Cb, the signal charge of the noise component Vfpn held in the second load capacitor 16b is expressed as follows: Qfpn=CbxVfpn.

After this, in the charge detecting operation illustrated in FIG. 9(c), first, when the reversing pulse φRVS is made to rise and the MOS transistors 27a, 27b are thereby turned on, the signal charge (Qsig.+Qfpn) of the signal component which had been held in the load capacitor 16a and the signal charge Qfpn of the noise component which had been held in the load capacitor 16b are connected in parallel, the reverse polarity sum of the two signal charges, i.e. Qsig.+Qfpn+(−Qfpn)=Qsig., appears at both ends thereof and the fixed pattern noise is canceled out. By turning on the MOS transistors 17a and 17b, which are first and second horizontal switches, a signal component Vsig. wherein fixed pattern noise has been canceled out from the load capacitors 16a and 16b is fed to the charge detecting circuit 22 by way of the horizontal signal line 19 as a signal charge Qsig., demodulated in this charge detecting circuit 22 and led out as the output signal OUT wherein fixed pattern noise has been canceled out.

In this way, when the second ends of the first and second load capacitors 16a and 16b are connected to the bias line 20 through the MOS transistors 26a and 26b, which are first and second biasing switches, the MOS transistors 27a, 27b, which are first and second reversing switches, are each connected between the second end of one and the first end of the other of the first and second load capacitors 16a and 16b and the signal component and the noise component held in the first and second load capacitors 16a and 16b are read out. As a result of the MOS transistors 27a, 27b being turned on while the MOS transistors 26a, 26b are turned off, the first and second load capacitors 16a and 16b are connected in parallel with mutually reversed polarity, the fixed pattern noise included in the signal component and the noise component (fixed pattern noise) cancel each other out and consequently, as in the case of the first preferred embodiment, it is possible to remove fixed pattern noise without providing a differential amplifier as an external circuit and furthermore because only one charge detecting circuit 22 is required the circuit construction also can be simplified.

Also, because the construction is such that when the signal component and the noise component held in the first and second load capacitors 16a and 16b are read out to the horizontal signal line 19, the first and second load capacitors 16a and 16b are connected in parallel with mutually reversed polarity by the action of the MOS transistors 27a, 27b. By accurately setting the capacitances of the two load capacitors 16a and 16b so that they are equal it is possible to certainly cancel out fixed pattern noise. Furthermore, as a result of the second ends of the first and second load capacitors 16a and 16b being fixed in a direct current manner (in this example, at a bias voltage determining the operating potential of the horizontal signal line 19) by way of the MOS transistors 26a, 26b, when reading out the signal component and when reading out the noise component from the pixel the influence of the parasitic capacities of the MOS transistors 15a, 15b and the MOS transistors 17a and 17b is not minimized. Consequently, it is possible to perform the operation of fixed pattern noise removal with more certainty.

As described above, according to this invention, by providing first and second capacitors having the same capacitance, respectively connecting first and second operating switches between a vertical signal line and first ends of the first and second capacitors a common operating switch between second ends of the first and second capacitors and a reference potential point, and connecting first and second horizontal switches between the second ends of the first and second capacitors and a horizontal signal line and a bias line at a predetermined potential, when a signal component and a noise component are read out from the first and second capacitors, the two components flow as charges into the horizontal signal line with reverse polarity, and are subtracted. Consequently, it is possible to remove fixed pattern noise without providing a differential amplifier as an external circuit. As a result, it is possible to promote simplification of the circuit construction and reduction in size of the scale of circuits around the device.

Also, by providing first and second capacitors having the same capacitance, respectively connecting first and second operating switches between a vertical signal line and first ends of the first and second capacitors, first and second biasing switches between second ends of the first and second capacitors and a first bias line at a predetermined potential, connecting first and second reversing switches between the second end of one and the first end of the other of the first and second capacitors and connecting first and second horizontal switches between the second ends of the first and second capacitors and a horizontal signal line and a second bias line at a predetermined potential, when a signal component and a noise component are read out from the first and second capacitors, the first and second capacitors are connected in parallel with mutually reversed polarity by the action of the first and second reversing switches and the noise component is canceled out. Consequently, it is possible to remove fixed pattern noise without providing a differential amplifier as an external circuit. As a result, it is possible to promote simplification of the circuit construction and reduction in size of the scale of circuits around the device.

Although modifications and changes may be suggested by those skilled in the art, it is the intention of the inventors to embody within the patent warranted hereon all changes and modifications as reasonably and properly come within the scope of their contribution to the art.

I claim:

1. A solid-state image pickup device comprising:
   a plurality of pixels arrayed in a matrix, each pixel having a main electrode and a control electrode;
   a vertical selection line commonly connecting said control electrodes of said pixels in each row;
   a vertical scanning circuit connected to said vertical selection line;
   a plurality of vertical signal lines commonly connecting said main electrodes of said pixels in each column;
   a horizontal scanning circuit for outputting signals to a horizontal signal line through said vertical signal lines;
   first and second capacitors having the same capacitance connected to each of said vertical signal lines;
   first and second operating switches respectively connected between said vertical signal line and first ends of said first and second capacitors;
   a common operating switch connected between second ends of said first and second capacitors and a reference potential node; and
   first and second horizontal switches respectively connected between said first ends of said first and second capacitors and said horizontal signal line or a bias line at a predetermined potential.

2. A solid-state image pickup device according to claim 2 wherein said first and second operating switches are transistors of the same size; and said first and second horizontal switches also are transistors of the same size.

3. A solid-state image pickup device according to claim 1 wherein the potentials of said reference potential node and said bias line are set to the same voltage as a bias determining the operating potential of said horizontal signal line.

4. A method for driving a solid-state image pickup device comprising a plurality of pixels arrayed in a matrix, each pixel having a main electrode and a control electrode; a vertical selection line commonly connecting said control electrodes of said pixels in each row; a vertical scanning circuit connected to said vertical selection line; a plurality of vertical signal lines commonly connecting said main electrodes of said pixels in each column; a horizontal scanning circuit for outputting signals to a horizontal signal line through said vertical signal lines; first and second capacitors having the same capacitance connected to each of said vertical signal lines; first and second operating switches respectively connected between said vertical signal line and first ends of said first and second capacitors; a common operating switch connected between second ends of said first and second capacitors and a reference potential node; and first and second horizontal switches respectively connected between said first ends of said first and second capacitors and said horizontal signal line or a bias line at a predetermined potential, and comprising the steps of:
   holding in a first capacitor a signal output from each pixel by an operation wherein said first operating switch is switched over from an on state to an off state while said common operating switch is in an on state;
   thereafter holding in a second capacitor a signal output from said pixel immediately after pixel resetting by an operation wherein said second operating switch is switched over from an on state to an off state while said common operating switch is in an on state; and
   thereafter outputting said signals held in said first and second capacitors through said horizontal signal line to an output terminal by turning said first and second horizontal switches on while said first and second operating switches and said common operating switch are off.

5. A solid-state image pickup device comprising:
   a plurality of pixels arrayed in a matrix, each pixel having a main electrode and a control electrode;
   a vertical selection line commonly connecting said control electrodes of said pixels in each row;
   a vertical scanning circuit connected to said vertical selection line;
   a plurality of vertical signal lines commonly connecting said main electrodes of said pixels in each column;
   a horizontal scanning circuit for outputting signals to a horizontal signal line through said vertical signal lines;
   first and second capacitors having the same capacitance connected to each of said vertical signal lines;
   first and second operating switches respectively connected between said vertical signal line and first ends of said first and second capacitors;
   first and second biasing switches respectively connected between second ends of said first and second capacitors and a first bias line at a predetermined potential;

first and second reversing switches respectively connected between said first end of one and said second end of the other of said first and second capacitors; and first and second horizontal switches respectively connected between said first ends of said first and second capacitors and said horizontal signal line or a second bias line at a predetermined potential.

6. A solid-state image pickup device according to claim 5 wherein said first and second operating switches are transistors of the same size; and said first and second horizontal switches also are transistors of the same size.

7. A solid-state image pickup device according to claim 6 wherein the potentials of said first and second bias lines are set to the same voltage as a bias determining the operating potential of said horizontal signal line.

8. A method for driving a solid-state image pickup device comprising a plurality of pixels arrayed in a matrix, each pixel having a main electrode and a control electrode; a vertical selection line commonly connecting said control electrodes of said pixels in each row; a vertical scanning circuit connected to said vertical selection line; a plurality of vertical signal lines commonly connecting said main electrodes of said pixels in each column; a horizontal scanning circuit for outputting signals to a horizontal signal line through said vertical signal lines; first and second capacitors having the same capacitance connected to each of said vertical signal lines; first and second operating switches respectively connected between said vertical signal line and first ends of said first and second capacitors; first and second biasing switches respectively connected between second ends of said first and second capacitors and a first bias line at a predetermined potential; first and second reversing switches respectively connected between said first end of one and said second end of the other of said first and second capacitors; and first and second horizontal switches respectively connected between said first ends of said first and second capacitors and said horizontal signal line or a second bias line at a predetermined potential in which driving method:

holding in a first capacitor a signal output from each pixel by an operation wherein said first operating switch is switched over from an on state to an off state while said common operating switch is in an on state;

thereafter holding in a second capacitors a signal output from said pixel immediately after pixel resetting by an operation wherein said second operating switch is switched over from an on state to an off state while said common operating switch is in an on state; and thereafter outputting said signals held in said first and second capacitors through said horizontal signal line to said output terminal by turning said first and second horizontal switches on after said first and second reversing switches are turned on while said first and second operating switches and said first and second biasing switches are off.

* * * * *